United States Patent [19]

Summers

[11] Patent Number: 5,122,262
[45] Date of Patent: Jun. 16, 1992

[54] SEPARATOR SCREEN WITH INTERMITTENT VACUUM

[76] Inventor: Thomas W. Summers, 5769 Snyder La., Petersburg, Ky. 41080

[21] Appl. No.: 464,220

[22] Filed: Jan. 12, 1990

[51] Int. Cl.$^5$ .............................................. B07B 1/50
[52] U.S. Cl. .................... 209/321; 209/235; 209/380
[58] Field of Search .............. 209/36, 37, 235, 250, 209/380, 321, 318, 312, 2, 22, 379, 255, 257

[56] References Cited

U.S. PATENT DOCUMENTS

| Re. 29,625 | 5/1978 | Summers | 209/139.1 |
|---|---|---|---|
| 2,257,322 | 9/1941 | Barnard | 209/380 |
| 2,284,671 | 6/1942 | Meinzer | 209/325 |
| 3,167,503 | 1/1965 | Pitchford | 209/380 X |
| 3,176,526 | 4/1965 | Fischer | 74/86 |
| 3,236,880 | 2/1966 | Brastad et al. | 209/321 |
| 3,250,389 | 5/1966 | Scruby et al. | 204/250 |
| 3,693,320 | 9/1972 | Garland | 209/250 |
| 3,796,312 | 3/1974 | Krolopp et al. | 209/250 X |
| 3,948,764 | 4/1976 | Edwards | 209/250 X |
| 4,485,009 | 11/1984 | Csontos et al. | 209/379 X |
| 4,880,530 | 11/1989 | Frey | 209/380 |
| 4,886,608 | 12/1989 | Cook | 209/380 |

FOREIGN PATENT DOCUMENTS

| 1177873 | 4/1959 | France | 209/321 |
|---|---|---|---|
| 430904 | 7/1974 | U.S.S.R. | 209/257 |
| 465226 | 11/1975 | U.S.S.R. | 209/250 |

OTHER PUBLICATIONS

Layne, Richard: "lost form—a New Way to Cast Car Parts", *Popular Science*, pp. 38, 39, Apr. 1986.

Primary Examiner—Donald T. Hajec
Attorney, Agent, or Firm—Wood, Herron & Evans

[57] ABSTRACT

A separator for continuously separating comparatively small particles of light bulk density such as, for example, expanded polystyrene x-beads from unexpanded polystyrene beads produced by an expansion process, preferably including a vibrating screen of a mesh size for passing smaller particles, but not larger particles, and a pulsed pressure differential across said screen for drawing smaller particles through the screen and for clearing the screen.

29 Claims, 1 Drawing Sheet

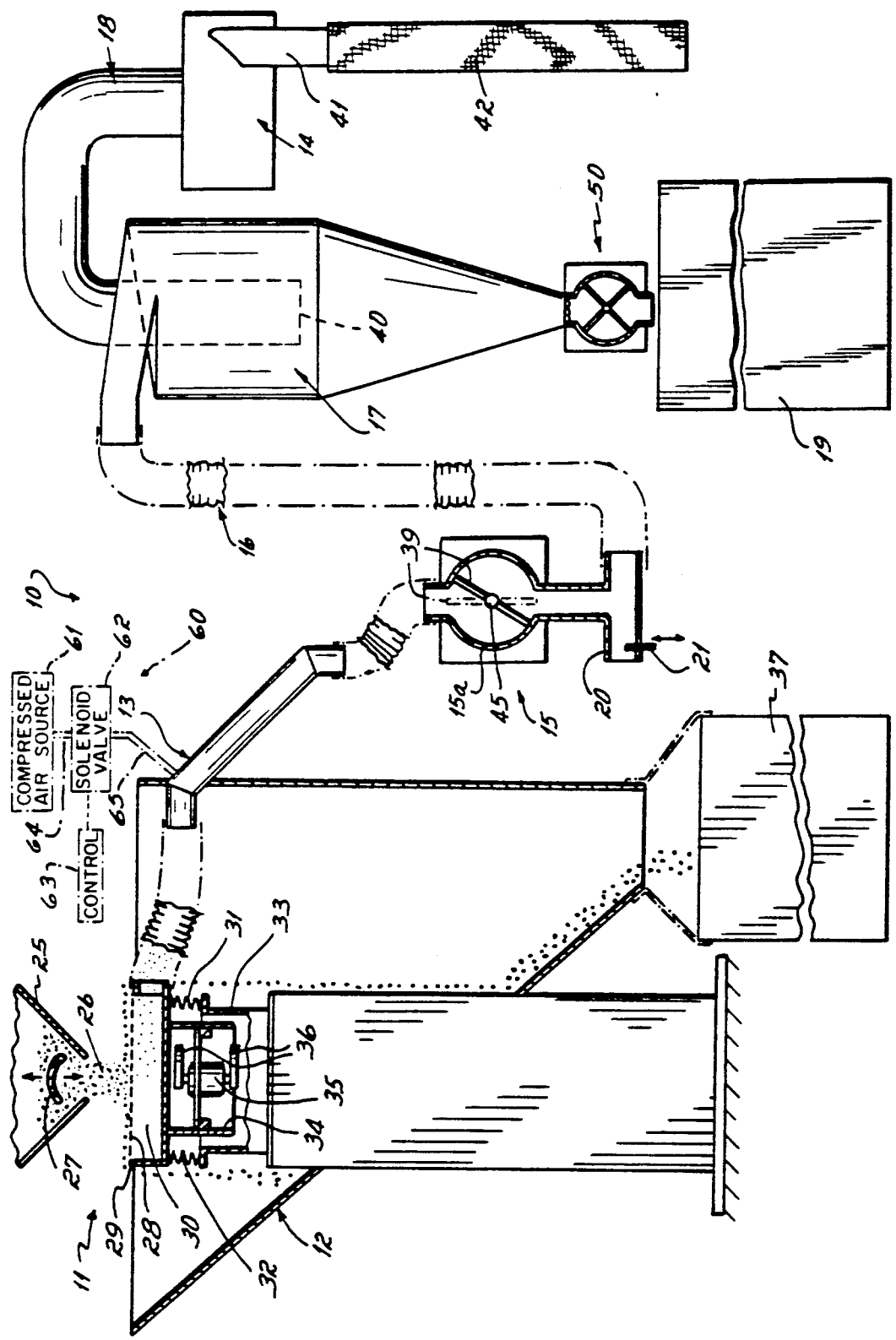

SEPARATOR SCREEN WITH INTERMITTENT VACUUM

This invention relates to particle separators and more particularly to apparatus and methods for separating particles which, due to their bulk densities and sizes, cannot be separated by known gravity screening systems at desirable flow rates.

The separation of small mesh size particles, of very light bulk density presents certain handling and flow difficulties. Such particles are hard to control and do not readily separate by gravity screening. Even when a vacuum is used to draw the smaller particles through a separation screen, the screen eventually "blinds" (i.e. is congested or blocked"), reducing and even stopping flow thru.

Application of a vibrating motion to a gravity screen helps to reduce blinding, but still does not produce sufficient flow thru efficiency.

Certain new technologies have now made the separation of small mesh size low density particles very critical in terms of commercial application. For example, the use of the "lost foam" casting process for producing intricate heads for internal combustion engines has required the provision of large amounts of a certain small size of expanded polystyrene beads known as "x-beads".

In the "lost foam" casting process, expanded beads are fed to an injection molding apparatus to provide a positive pattern of the part to be cast. A thin shell, such as a ceramic material, is sprayed onto the pattern. Loose sand is thereafter formed about the plastic pattern to form a sand mold. Thereafter, molten metal, such as aluminum, is poured into the mold. The metal vaporizes the plastic pattern through the ceramic shell and fills out the mold, forming a very accurate metal reproduction of the plastic pattern. The ceramic shell permits gases from the vaporized pattern to escape, and prevents sand from caving into the mold cavity.

The expanded x-beads, used in this process, are currently the finest size of the various commercial use polystyrene beads. They are made by treating unexpanded beads of the same material, according to known processes, such as steaming, to expand them. Such processes typically produce expanded beads in bulk mixed together with some beads which are not expanded, much in the way a batch of popcorn may include several unpopped kernels.

In the "lost foam" process, it is important to provide a pattern material from expanded x-beads in adequate volume, without undesirable non-expanded beads of smaller size therein. Non-expanded beads in the plastic pattern do not vaporize like the expanded beads, but tend to carbuerize as a deposit on the interior of the ceramic shell. This deposit produces an undesirable indentation, bridge or other imperfection in the finished metal part, which can render the part unacceptable, particularly where the part surface must be held to a critical tolerance.

It is accordingly necessary to separate out the unexpanded beads from the expanded beads to be used, and to do so at a rate which can produce sufficient volumes of separated expanded beads for the pattern volumes demanded by the casting processes.

The bulk density of the expanded and unexpanded polystyrene x-beads, together with the mesh sizes involved, however, make it very difficult, if not impossible, to use gravity screening processes for separation at a rate reasonably sufficient to meet the need for expanded x-beads without unexpanded beads therein.

Accordingly, it has been an objective of the invention to provide improved apparatus and methods for separating particles of light bulk density and relatively small mesh sizes.

A further objective has been to provide improved apparatus and methods for separating expanded polystyrene x-beads from unexpanded polystyrene beads mixed therein.

To these ends, a preferred embodiment of the invention contemplates the use of a vibrating separation screen and the establishment of a pulsed fluid pressure differential across the screen for drawing unexpanded beads therethrough and for clearing the screen of obstructions. More particularly, the preferred embodiment of the invention includes a vibrating screen, of a mesh size to pass unexpanded polystyrene beads but not expanded polystyrene x-beads, and an apparatus for intermittently generating both a reduced fluid pressure on a downstream side of the screen for drawing unexpanded beads through the screen, and an intermittent pressure equalization, for clearing the screen. Expanded x-beads pass over the screen for collection at ambient atmospheric pressure, while unexpanded beads are pulled through the screen by the lower pressure thereunder for collection and disposal or other use, all in a continuous process without process stopping screen blinding. In this manner, the effluent of expanded beads from the screening process is greatly enriched, with unexpanded beads being separated therefrom.

Preferably, the screen is horizontally disposed and the mix of combined beads is fed to its center and moves outwardly across the screen. Unexpanded beads pass through the screen and are conveyed away through a conduit by the intermittent flow of fluid or air pressure. Expanded beads fall off the peripheral edge of the screen into a surrounding collection funnel.

A two-vane rotary valve is connected in the unexpanded bead conduit between the downstream side of the screen and a reduced pressure source or air pump. The rotary valve is constantly driven so the vanes intermittently open the conduit to establish a pressure differential across the screen and then obturate or close off the conduit to interrupt the fluid flow. This momentarily equalizes fluid pressure on both sides of the separation screen and its vibration clears any obstructions. Rotation of the vanes past their obturation position again applies a pressure differential across the cleared screen to draw unexpanded beads therethrough. These beads flow through the screen, some perhaps building up partial obstructions therein, until the air flow is again interrupted for screen clearing by rotation of the valve.

Downstream of the valve, the unexpanded beads are drawn through a cyclone to separate them from the fluid flowing to the reduced pressure source or pump. Unexpanded beads are collected from the cyclone and fluid passing through the negative pressure source is screened so that all unexpanded beads are captured.

The screen vibration amplitude and frequency, screen size, mesh, the air pressure and flow rate, conduit length and diameter, valve size, vane number and rotational valve speed can all be selected to optimize the separation process for the screen mesh and particle sizes involved. Also, the duration of both phases of pulsed pressure differential could be adjusted in any suitable manner to produce a separator process as desired.

In an alternate embodiment, as necessitated by any particular screening process, a pulse of positive fluid pressure in excess of that pressure on the particle-receiving side of the screen, is applied to the downstream side of the screen to blow in a reverse direction to clear screen obstructions formed by particles bridging openings therein.

These and other objective and advantages will become still more readily apparent from the following detailed description of a preferred embodiment and from the drawings in which:

The FIGURE is a schematic illustration of a preferred apparatus and process according to the invention.

DETAILED DESCRIPTION OF THE DRAWING

Turning now to the FIGURE, there is diagrammatically illustrated therein the separation apparatus 10 according to a preferred embodiment of the invention. It will be appreciated that the invention is particularly useful in separating one smaller size of particle from a larger size of particle, both being relatively small, and at the same time being of very light bulk density. As discussed above, it is very difficult to handle very small particles of very light density. These particles tend to have very little inertia and if of plastic or other materials, may have certain static electric properties which causes them to cling or otherwise resist desirable movement or flow. It is the combination of the very small particle size, together with a very light density material of the particles which renders them hard to handle and to separate.

While certain particles of various certain sizes may be adequately gravity screened and thus separated, the critical mesh size or cut point of particle size with which this invention finds particular utility is a function of the bulk density of the material. For example, the lower that density, then the bigger mesh opening required to make normal gravity screening acceptable from a sufficient flow thru standpoint. Particles of greater bulk density can be gravity screened to smaller mesh sizes.

As an example only, and considering polystyrene x-beads, such beads have a bulk density of approximately 1.4 pounds per cubic foot. The gravity screening of these beads below ten mesh size is ineffective. Yet it is this size mesh or below required for separation of unexpanded beads. In other words, the application of a mix of these beads to a ten mesh screen will not result in a continuous screened flow thru. Instead, the screen will tend to blind. Even if a vacuum might be used to pull unexpanded beads through the screen, it will soon blind, terminating separation flow and efficiency.

On the other hand, for example, sand has a bulk density in the neighborhood of approximately 80 pounds per cubic foot. Such particles can be efficiently gravity screened down to approximately 180 mesh before the gravity feed screen tends to clog too much and presents problems to continued flow thru.

Accordingly, it will be appreciated that the invention is useful in the separation of a plurality of smaller particles from a plurality of larger particles, where the particles are of a material having a very light bulk density and the sizes of the particles to be separated from each other are relatively small, such that normal gravity screening of these particles through a screen of the mesh size desired cannot be maintained on a constant flow thru basis.

The particular size and density parameters of particles with which the invention has particular utility might also be defined by reference to the so-called "settling velocity" of particles of a certain mesh size. The phrase, "settling velocity", as used, refers to that velocity of air in a vertical air column which will maintain a particle of a given mesh size in a floating configuration, without settling and without rising, and is generally a function of the particle size, shape and bulk density. Any component or particle of a certain mesh size with a settling velocity greater than a predefined critical number might be defined as a particle which could be adequately screened at that size by a known gravity screening process. Particles of that same size with a settling velocity less than the critical number could be more advantageously separated from particles of other sizes, less than this critical number, by the use of the invention herein. The critical number will then vary according to the respective settling velocities of the various particles considered.

As noted above, and while not limited thereto, the invention finds particular utility in the separation of unexpanded polystyrene beads from the expanded polystyrene x-beads below a ten mesh size. One particular separation apparatus for carrying out such separation is shown in the FIGURE at 10.

The apparatus 10 includes a separation station 11 surrounded by an expanded x-bead collection funnel 12 and operatively connected to a source 14 of low pressure air, such as an air or vacuum pump, via conduit 13, valve 15 and conduit 16, cyclone 17 and conduit 18. The unexpanded bead and low pressure conduit 13 is operatively connected to the separation station as will be described. This conduit defines a passageway for low pressure air which is eventually connected to low pressure source 14.

Rotary valve 15 comprises a cylindrical housing 15a surrounding a rotor comprised of two opposed vanes 39 on rotary axis 45. When the vanes 39 are in their solid-line position, the valve is closed. When vanes 39 are in their dotted-line position, valve 15 is open.

Cyclone 17 is provided to separate fluid driven unexpanded beads, moving through conduit 16 in the direction of the low pressure air source 14, from the moving air. A further conduit 18 connects the air outlet of cyclone 17 with the low pressure source 14 while the unexpanded beads separated from the air flow by the cyclone 17 are deposited into a collection bin 19. Thus, in essence, conduits 13, 16 and 18 form, together with a valve 15 and cyclone 17, a low pressure air passageway, leading from a separation station 11 to the low pressure air source 14.

It will also be appreciated that downstream of the valve 15 is a T-section. Conduit 16 is connected to one side of the T-section 10. The other side 20 of the T-section is attached a movable damper or gate 21. The damper or gate 21 is adjusted to permit the intake of a desirable amount of ambient air into the system, downstream of the valve 15, as desired for further systems control.

At the separation station 11, a feed hopper 25 is filled with a mixture of unexpanded polystyrene beads together with expanded polystyrene x-beads. Such mixture 26 is fed past a metering member 27 in feed hopper 25 and is deposited on preferably flat screen 28, preferably having a mesh size of about 28 mesh which has been found to be useful in separating unexpanded polystyrene beads from expanded polystyrene x-beads according to the invention herein.

The screen 28 is mounted above a cylinder-shaped housing 29 which forms a cylindrically-shaped plenum 30 directly beneath the screen 28. The cylindrical housing 29 is mounted via springs 31 and 32 to a support 33. Mounted on the housing 29 is a vibrating mechanism 34, including a motor 35 and eccentric weights 36. When the motor is operated, the weights swing about and vibrate the entire cylindrical housing 29 and the screen 28 thereon. Such vibration delivers a conveying action to the mixture 26 of polystyrene beads on the face of the screen, and the mixture moves from the center deposit area of the screen to the circular periphery of the screen. During this movement, the smaller unexpanded beads tend to drop through the screen while the larger beads are conveyed to the peripheral edge of the screen and fall off that edge into the funnel 12. The expanded beads slide down the funnel and into a expanded bead collection bin 37.

The unexpanded beads are pulled through screen 28 and are removed from the plenum 30 by means of an air flow in a direction through and away from the plenum, toward the low pressure air source 14 through the conduits 13, 16 and 18 and the intervening valve 15 and cyclone 17. Accordingly, when the vacuum or air pump 14 is operated and the valve 15 is open, as indicated by the dotted line position of the vanes 39, a pressure differential is created across the screen 28.

The first or upper side of the screen 28 onto which the mixture of beads 26 is first introduced is exposed to ambient air pressure. On the other hand, the second side, underside or downstream side of the screen 28 is adjacent the plenum 30 which is operatively connected to the low pressure air source 14. This source reduces pressure in the conduits 18, 16 and 13 and thereby creates a lower pressure in the plenum chamber 30 than that ambient pressure on the first or upper side of the screen. Accordingly, this pressure differential tends to pull air through the screen, the air carrying with it the smaller sized unexpanded beads through the mesh of the screen. The low pressure air source 14 thus creates a flow of air through the screen, and the unexpanded beads are entrained in that air flow and are conveyed through the conduit 13, through the valve 15 when it is in its open condition, through the conduit 16 and into the cyclone 17.

There, the flow of air is spun centrifugally about and the unexpanded beads, by centrifugal force, are thrown outwardly to the sides of the cyclone 17. Thereafter, they slide down the outer cyclone sides, move through an air-lock 50, and are collected in the bin 19.

The conduit 18 has an upstream end 40 disposed in a central area of the cyclone 17. Air, free of unexpanded beads, enters into the open end 40 of the conduit 18 and is conveyed through the conduit to the low pressure air source or pump 14. Outlet 41 from the pump 14 is covered by a cylindrical final filter 42 for cleaning the effluent from the low pressure source 14 including dust, any unexpanded beads which might have found their way through the cyclone 17, etc. The final filter may be made of woven or nonwoven fabric, paper or other filtering means as is known in the art.

Returning now momentarily to the valve 15, it will be appreciated that the vanes 39 rotate from an open position to a closed or obturation position where the air flow is cut off momentarily. Accordingly, as the axis 45 is rotated, the valve serves the purpose of intermittently interrupting the low pressure caused by the source 14 on the second side of the screen 28 and in plenum 30. Accordingly, the pressure in the plenum 30 preferably varies between a pressure which is lower than that on the upper side of the screen 28 to a pressure which is substantially equalized with the pressure on the upper side of the screen. When pressure is equalized, there is no force pulling screen obscuring beads into the screen and they are knocked loose by the screen vibration clearing the screen. This intermittent pulsing of a pressure differential across the screen 28 thus functions to prevent substantial build-up of screen blinding particles on the screen surface.

More specifically, it will be appreciated that as the lower pressure in the plenum 30 pulls unexpanded beads through the screen, certain configurations of beads, as they move toward the screen mesh may tend to obstruct or blind the screen. After a certain time period, the application of this pressure differential could cause the screen to become partially or totally blinded, thereby cutting off all flow of unexpanded beads through the screen. Once this occurs, the separation process effectively ends and the mixture of unexpanded and expanded both are conveyed off the edge of the screen and fall into the funnel 12 without separation.

The pulsing of the pressure differential relieves blinding pressure on the screen so the vibration clears the particles that could cause the blinding to occur. When the pressure is equalized, the mechanical vibration of the screen as described above has been found sufficient to maintain outward movement of beads, thereby keeping the screen clear of obstructions.

Thereafter, as the valve 15 opens, the pressure differential is re-established and serves to draw further unexpanded beads through the screen until it is again obscured. Valve 15 is again closed, pressure equalized, and the tendency for near size particles to plug or blind eliminated. This process of intermittently creating or pulsing a pressure differential across the screen serves to provide a continuous separation process by which unexpanded beads are drawn through the small mesh screen, while at the same time the screen is frequently cleared so as to prevent its obstruction and a breakdown of the separation process. Viewed in another way, the preferred embodiment of the invention is predicated on the concept of a pulsed pressure differential created across the separation screen to both draw smaller particles through the screen and intermittently clear the screen of any obstructions such as by combination of unexpanded and expanded beads at the screen face.

It will be appreciated that the vibration of the screen is helpful in clearing screen obstruction even while air is flowing through the screen. However, the screen will eventually blind despite such vibration. The combination of the screen vibration, which aids in maintaining flow through the screen during airflow thereacross, and the periodic relaxation or equalization of pressure differential produces an essentially continuous separation process for effectively removing unexpanded beads from expanded polystyrene x-beads at greater separation or flow through rates, than by gravity screening alone, vibrating screening alone, or suction screening alone.

While any suitable equipment according to the above description can be used in accomplishing the results noted, the following equipment has been found useful in a prototype embodiment of the invention.

A Sweco P.O.D. (Peripheral Oversized Discharged) separator has been found useful as comprising the separation station 11. This equipment is manufactured by Sweco, Inc. of Florence, KY under various models numbers such as PD-48 and PD-60. That equipment may be modified to provide a single screen deck as shown in the FIGURE of this application.

The rotary valve 15 is a modification of the conveying valve manufactured under the name "CV Conveying Valve" by Semco, Inc. of Houston, TX. That valve is modified preferably by removing all but two opposed vanes within the valve so as to produce the pulsed air flow or pressure differential as described above.

The cyclone 17 may be of any suitable construction. Such cyclones are available from a number of suppliers. The low pressure air source or air pump 14 is also available commercially.

An air lock 50 is disposed between the outlet of the cyclone 17 and the collection bin 19. Such air lock preferably comprises, for example, a Semco OBRV valve manufactured by Semco, Inc. of Houston, TX.

It will be appreciated that many parameters of the above described apparatus can be varied to produce desired results for the particular particles to be separated. For example, the screen mesh size, overall screen size, plenum capacity, number of screen decks, the conduit length and diameter, the CFM capacity of the low pressure air source, and the effective operational cross section area of the valve 15, number of valve vanes, together with the speed at which the vanes are rotated, and pressure pulse rate can all be varied to produce a particular or desired result. Moreover, a pulsed pressure differential alone, without screen vibration, might in some cases, prove useful in a screening process, as would a reverse differential for screen clearing.

It should also be appreciated that depending on the bulk density, particle size, screen mesh and vibration frequency and amplitude, it may not be necessary to exactly equalize pressure on each side of the screen to permit the vibration to clear it. Substantial equalization is produced in the preferred embodiment described.

In the particular case of the separation of unexpanded polystyrene beads from expanded polystyrene x-beads, the screen, which has been found to be useful, is approximately 30 mesh size, 24 inches in diameter. The plenum chamber beneath the screen is of essentially the same diameter and approximately 4 inches thick from top to bottom. The conduit attached to the plenum is 6 feet long and approximately 4 inches in diameter. The valve 15 has two vanes 39, each about 2 inches long and 4 inches wide, located directly opposite each other, as shown on the axis 45, and is driven at a rotational speed of about 30 rpm. Conduit 16 is approximately 8 feet long and approximately 4 inches in diameter. The conduit 18 is approximately 2 feet long and approximately 4 inches in diameter. The low pressure air source is approximately one horse power and produces approximately 100 cfm.

Separation rates produced by the invention as described are approximately 300 pounds of expanded polystyrene x-beads per hour, and approximately one pound of unexpanded polystyrene per hour separated. The amplitude and frequency of the vibration of the screen is as follows: ¼" amplitude and 1200 cpm frequency.

It will also be appreciated that the preferred embodiment of the invention has been described as used in ambient atmospheric conditions where air is the operative fluid. Of course, the apparatus and methods described herein could be used with other operative fluids where desirable.

While a preferred embodiment has been described, an alternate embodiment may also be useful. For example, as particles pass through the screen, it is possible that various random configurations of particles can bridge or jam across a screen opening, plugging it. While the pulsed pressure differential described herein, together with screen vibration might, for example, clear some such bridging, some bridging or plugging cannot be so cleared.

According then, to an alternate embodiment of the invention, means are provided for clearing such semipermanent plugging of particles within openings of said screen.

Such means are illustrated by the phantom lines in the center of FIGURE at 60, and include a source of compressed air 61 such as an accumulation or surge tank, a solenoid valve 62 and a valve control 63. Tank 61 is connected to valve 62 by means of conduit 64. Valve 62 is connected by conduit 65 into conduit 13 between rotary valve 15 and plenum 30.

The solenoid valve 62 could be of any suitable configuration and is selectively operable to a momentarily open position wherein compressed air at a pressure higher than ambient air pressure on the particle receiving side of screen 28 is established in plenum 30 beneath the screen. When solenoid valve 62 is opened, relatively high fluid or air pressure is applied to conduit 13 and plenum 30, thus blowing air through screen 28 in a reverse direction to the normal passage of particles therethrough. This clears particles plugging, bridging or jamming screen openings.

Control 63 is only diagrammatically shown and can be of any suitable control for momentarily opening solenoid valve 62 to send a pulse of higher pressure air through screen 28 in a reverse direction. Control 63 can be manually operated to briefly open solenoid valve 62, based on visual observation of screen 28 and the need for clearing. Control 63 could be provided in a programmable configuration to automatically produce such an intermittent pressure pulse, based on a present adjustable frequency, to suit the particular screening operation as needed.

Also, it will be appreciated that control 63 can be operatively connected to or timed with rotary valve 15 so that a pulse of high pressure air is directed to conduit 13 and plenum 30 when valve 15 is closed, so as to more efficiently pressurize conduit 13.

These and other modifications and advantages will become readily apparent to one of ordinary skill in the art without departing from the scope of this invention. The applicant intends to be bound only by the claims appended hereto.

I claim:

1. Apparatus for separating a plurality of first particles of one size and smaller from a plurality of second particles of another larger size comprising:
    a separation screen having one size for receiving a mix of both said first and second particles, said screen having a mesh size large enough to pass said first particles placed thereon but too small to pass said second particles placed thereon,
    means for intermittently creating a fluid pressure differential and fluid flow across said screen and for interrupting fluid flow across said screen to draw small first particles therethrough and to prevent obstruction of said screen, whereby fluid pressure differential across said screen is intermittently substantially equalized, and fluid flow across said screen is interrupted, and whereby first smaller particles are passed through said screen and are thereby separated from second particles.

2. Apparatus as in claim 1 and further including first means for collecting larger second particles from a peripheral edge of said separation screen, and second means for collecting small first particles from a second side of said screen, said second collecting means including a plenum adjacent said second screen side and a first particle conduit operatively attached thereto.

3. Apparatus as in claim 2 further including a low pressure source, said first particle conduit connected between said plenum and said lower pressure source, and a valve means connected between said plenum and said low pressure source for intermittently closing said conduit and interrupting lower pressure in said conduit and plenum established by said low pressure source.

4. Apparatus as in claim 3 further including a vent means operatively connected in said conduit between said valve means and said low pressure source, said vent means including an adjustable damper means for controlling the operative size of said vent means.

5. Apparatus as in claim 4 wherein said low pressure source is an air pump and further including a cyclone separator operatively connected between said low pressure source and said valve means for collecting first particles before they can be sucked into said air pump.

6. Apparatus for separating a plurality of first particles of one size and smaller from a plurality of second particles of another larger size comprising:

a separation screen having one side for receiving a mix of both said first and second particles, said screen having a mesh size large enough to pass said first particles placed thereon but too small to pass said second particles placed thereon, means for creating a lower fluid pressure on another second side of said screen than on said first side for drawing first particles from said first screen side therethrough, and means for intermittently interrupting said lower pressure such that any pressure differential across said screen is at least substantially equalized and fluid flow intermittently interrupted for preventing obstruction of said screen.

7. Apparatus as in claim 6 further including means for selectively creating a fluid pulse of higher pressure on said second side of said screen at a frequency for preventing blinding of said screen.

8. Apparatus as in either claim 6 or 7 including means for vibrating said screen.

9. Apparatus for separating unexpanded polystyrene beads from expanded polystyrene beads comprising:

a separation screen, having a mesh size of 10 mesh or smaller, for receiving a mixture of said beads on a first side thereof, and for passing unexpanded beads therethrough to a second side thereof, said mesh size being too small to pass said expanded beads, means for vibrating said screen, means for creating a lower air pressure on said second side of said screen than on said first side for producing a fluid flow across said screen to draw said unexpanded beads therethrough, and means for intermittently interrupting the lower pressure on said second side of said screen for interrupting said fluid flow and for clearing screen obstruction.

10. Apparatus as in claim 9 further including means for collecting said expanded beads from a peripheral edge of said screen, conduit means for collecting and transporting unexpanded beads from a plenum area proximate the second side of said screen, and valve means operatively disposed in said conduit means between said second screen side and said low air pressure means for intermittently interrupting said lower pressure on said second side of said screen.

11. Apparatus as in claim 9 further including means to apply a pulse of fluid pressure to said second side of said screen for blowing occluding particles in screen openings in a reverse direction to clear said screen of such particles.

12. A method of separating a plurality of first smaller particles from a plurality of second larger particles comprising the steps of:

feeding a mixture of said first and second particles onto a separation screen having a mesh size for passing first smaller particles but preventing passage therethrough of second larger particles, vibrating said screen, intermittently creating a pressure differential across said screen for producing an intermittent fluid flow for respectively drawing first particles therethrough and for clearing said screen, collecting first smaller particles passing through said screen, and collecting second larger particles passing off said screen.

13. A method of separating a plurality of first smaller particles from a plurality of second larger particles comprising the steps of:

feeding a mixture of said first and second particles onto a separation screen having a mesh size for passing first particles but preventing passage therethrough of second particles, conveying said particles across said screen, and intermittently establishing a pressure differential and substantially equalizing said pressure differential across said screen for drawing first particles therethrough and for clearing said screen.

14. A method of separating a plurality of first smaller particles from a plurality of second larger particles comprising the steps of:

feeding a mixture of said first and second particles onto a first side of a separation screen having a mesh size for passing first particles through to a second side of said screen but preventing passage therethrough of second particles, conveying said particles across said first side of said screen, creating a lower pressure on said second side of said screen than on said first side for producing a fluid flow across said screen and pulling first particles therethrough, and intermittently interrupting said lower pressure and said fluid flow for clearing obstructions therein.

15. A method as in claim 14 wherein the step of interrupting said lower pressure includes substantially equalizing pressures on each side of said screen.

16. A method as in claim 14 including the step of increasing pressure on the second side of said screen beyond the pressure on a first screen side to clear obstructions therein.

17. A method as in claim 14 including the step of vibrating said screen at least during said interruption of said lower pressure.

18. A method of separating a plurality of unexpanded polystyrene beads from a plurality of larger expanded polystyrene x- beads comprising the steps of:

feeding a mixture of said smaller and larger beads onto a first side of a separation screen having a mesh size for passing the smaller beads but preventing passage therethrough of said expanded beads, conveying said beads across said screen, and intermittently establishing a pressure differential across said screen for drawing said smaller beads therethrough and for clearing said screen.

19. A method as in claim 18 including the step of drawing said smaller unexpanded beads through said separation screen having a mesh size no larger than 10 mesh, while said larger expanded x-beads travel across said screen.

20. A method as in claim 18 wherein the step of intermittently establishing a pressure differential includes substantially equalizing pressures on each side of said screen.

21. A method as in claim 18 including the step of increasing pressure on a second side of said screen beyond the pressure on a first screen side to clear obstructions therein.

22. A method as in claim 18 including the step of vibrating said screen at least during said interruption of said lower pressure creation.

23. A method of separating a plurality of smaller particles from a plurality of larger particles comprising the steps of:

feeding a mixture of said smaller and larger particles onto a first side of a separation screen having a mesh size for passing the smaller particles but preventing passage therethrough of said larger particles, conveying said particles across said screen and intermittently establishing a pressure differential producing a fluid flow across said screen and substantially equalizing said differential for drawing said smaller particles therethrough and for clearing said screen.

24. A method as in claim 23 including the step of drawing said smaller particles through said separation screen having a mesh size no larger than 10 mesh, while said larger particles travel across said screen.

25. A method as in claim 23 wherein the step of intermittently establishing a pressure differential includes substantially equalizing pressures on each side of said screen.

26. A method as in claim 23 including the step of intermittently increasing pressure on a second side of said screen beyond the pressure on a first screen side at a frequency to maintain said screen from blinding.

27. A method as in claim 23 including the step of vibrating said screen at least during said interruption of said pressure differential.

28. Apparatus for separating a plurality of first particles of one size and smaller from a plurality of second particles of another larger size comprising:

a separation screen having one side open to the atmosphere for receiving a mix of both said first and second particles, said screen having a mesh size larger enough to pass said first particles and smaller particles placed thereon but too small to pass said second particles placed thereon, means for dropping said mix onto said screen, wherein said first and smaller particles pass therethrough, plenum means on a second side of said screen, means for intermittently creating a higher fluid pressure in said plenum and on said second side of said screen to prevent blinding of said screen.

29. Apparatus for screen separating a plurality of first particles of one size and smaller from a plurality of second particles of another larger size and for maintaining a flow of first particles through said screen, at a predetermined efficiency, said apparatus comprising:

a separation screen having one side for receiving a mix of both said first and second particles, said screen having a mesh size large enough to pass said first particles placed thereon but too small to pass said second particles placed thereon, means for applying a lower pressure on a second side of said screen for producing a fluid flow through said screen and drawing small first particles therethrough, and means for intermittently interrupting said lower pressure, such that the pressure differential across said screen is substantially equalized and resulting fluid flow terminated to maintain a predetermined particle separation efficiency of said screen to prevent obstruction of said screen, whereby first smaller particles are passed through said screen and are thereby separated from second particles, and whereby said screen is maintained in a condition to pass said first articles therethrough without obstructing or blinding.

* * * * *